United States Patent
Tsujimoto (10) Patent No.: US 6,195,512 B1
(45) Date of Patent: *Feb. 27, 2001

(54) CAMERA ADAPTED FOR FILMS PROVIDED WITH MAGNETIC STORAGE PORTIONS

(75) Inventor: Shinichi Tsujimoto, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/599,261

(22) Filed: Feb. 9, 1996

Related U.S. Application Data (63) Continuation of application No. 08/193,555, filed on Feb. 8, 1994, now abandoned.

(30) Foreign Application Priority Data

Feb. 12, 1993 (JP) .................................................. 5-046142

(51) Int. Cl.[7] .................................................. G03B 17/24
(52) U.S. Cl. .................................. 396/319; 396/311; 360/1
(58) Field of Search .................................. 354/105, 106; 355/40, 41; 360/1, 3, 110, 113, 119, 123; 396/319, 320, 311

(56) References Cited

U.S. PATENT DOCUMENTS

| | | | |
|---|---|---|---|
| 4,878,075 | 10/1989 | Cannon | 354/173.1 |
| 4,928,186 | 5/1990 | Matsumoto et al. | 360/21 |
| 4,977,419 | 12/1990 | Wash et al. | 354/76 |
| 5,005,031 | * 4/1991 | Kelbe | 396/319 |
| 5,321,452 | * 6/1994 | Tsujimoto | 354/106 |
| 5,761,555 | * 6/1998 | Ishihara et al. | 396/319 |

FOREIGN PATENT DOCUMENTS

| | | | |
|---|---|---|---|
| 0475447A3 | 3/1992 | (EP) . | |
| 2249103 | 10/1990 | (JP) . | |
| 5-119836 | * 5/1993 | (JP) | 354/105 |

* cited by examiner

Primary Examiner—Alan A. Mathews
(74) Attorney, Agent, or Firm—Fitzpatrick, Cella, Harper & Scinto (57) ABSTRACT

There is disclosed a camera adapted for films provided with magnetic storage portions or a magnetic recording apparatus for the camera of the type described comprising first information writing means for writing information in a first area of a magnetic storage portion of the film; and second information writing means for writing information in a second area of the magnetic storage portion, the second area being outward the first area of the first information writing means, the second information writing means comprising means for elongating a distance to the second area of the magnetic storage portion of the film in which the second information writing means is capable of writing information than a distance to the first area of the magnetic storage portion of the film in which the first information writing means is capable of writing information.

10 Claims, 5 Drawing Sheets

CAMERA ADAPTED FOR FILMS PROVIDED WITH MAGNETIC STORAGE PORTIONS

This application is a continuation of application Ser. No. 8/193,555 filed Feb. 8, 1994, now abandoned.

BACKGROUND OF THE INVENTION

1. Field of the Invention

This invention relates to a camera adapted for films provided with magnetic storage portions and, in particular, to an improvement of information writing to the magnetic storage portion.

2. Related Background Art

Conventionally, U.S. Pat. No. 4,977,419 discloses a color negative film including a virtually transparent magnetic layer on a base surface of the film, and a camera having a magnetic head for magnetically recording information in the film or for reading the information recorded in the film. It also discloses to provide on an outside edge of the exposed face of the film a plurality of recording tracks in which the camera records information magnetically. This increases the amount of information to be recorded for individual frames by means of increasing the number of recording tracks.

Disclosed as the information recordable by the camera is photographing information such as the date of photographing, time, the type of illumination light source used upon photographing, pseudo zoom information, exposing time, diaphragm values or the like.

Alternatively, U.S. Pat. No. 4,878,075 discloses that a filmstrip is previously provided with film information written therein such as film sensitivity and film regulated frame number, and that a camera reads this information before exposure while it re-writes this information upon taking up the film after completion of exposure to record various types of information upon photographing.

To read film information previously written in a magnetic layer on a base side of the film or to write photographing information in the magnetic layer in cooperation with an exposing operation by using a magnetic head disposed in a camera, the film is required to be transported with the magnetic head being joined to the above mentioned magnetic layer. With this respect, typical cameras are so structured that a film is pinched by spring operation between the magnetic head disposed on the base side of the film and a pad disposed at a position opposing to said magnetic head on the emulsion-applied surface of the film. Accordingly, flaws or pressure marks (sensitizing due to pressure) are caused on sliding portions to the magnetic head because of the pressure required for pinching. As a result, reading of the film information and writing of the photographing data by the camera are made only at the peripheries of frames out of the frames of the film.

Figure 6:
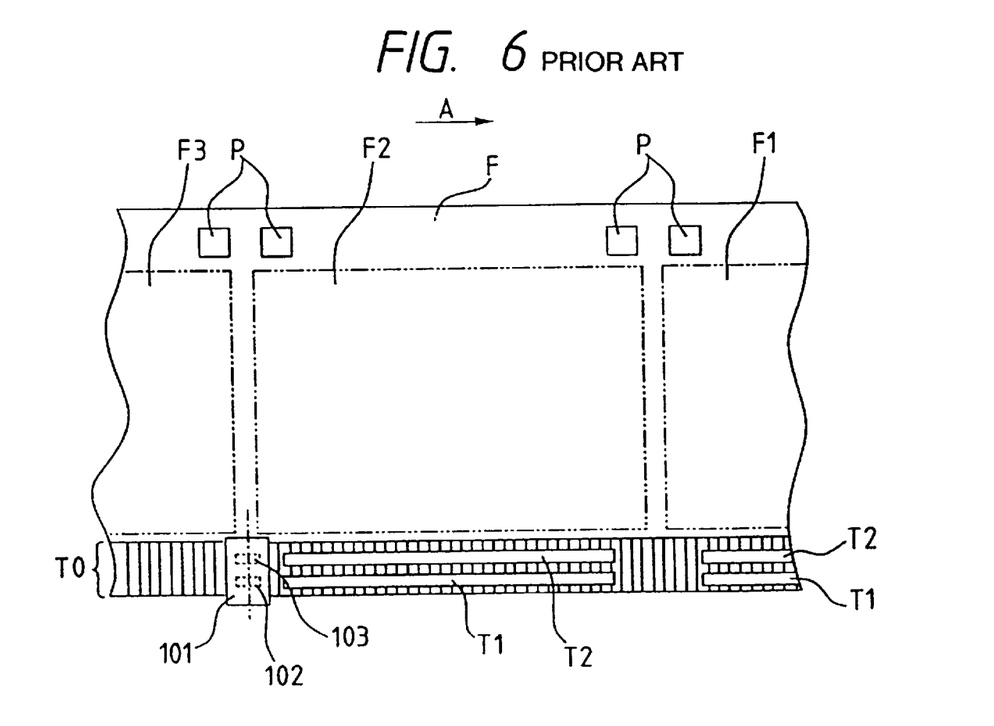
FIG. 6 is a view illustrating operation of magnetic recording on the film.
Figure 7:
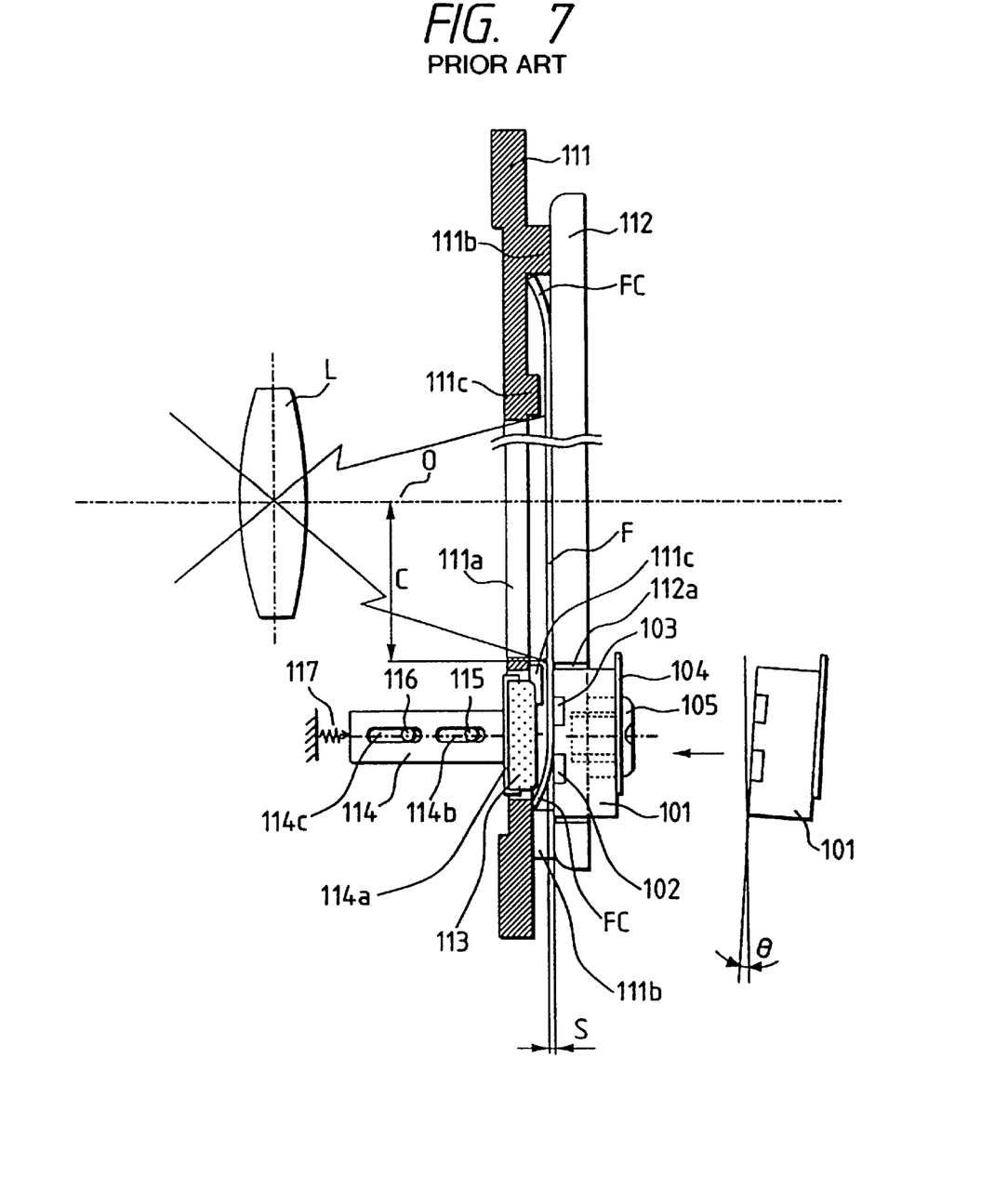
FIG. 7 is a vertical sectional view of a camera having a magnetic head.

FIGS. 6 and 7 are views for use describing the above. FIG. 6 is a view illustrating operation of magnetic recording on the film. In FIG. 6, F represents a film including a magnetic film (hereinafter, simply referred to as a film), F1 and F2 represent exposed frames, F3 represents an unexposed frame and P represents a perforation. T0 represents a film information track previously magnetically recorded in the film F, in which film information such as an ISO sensitivity of the film is recorded. A reference numeral 101 represents a magnetic head of a camera. The magnetic head comprises a first magnetic track forming unit 102 and a second magnetic track forming unit 103. T1 and T2 represent first and second photographing information tracks, respectively, for individual frames recorded by the first and the second track forming units 102 and 103 in place of the film information in the film information track T0 (overwriting using saturation recording) before one frame of the film is transported in a direction depicted by an arrow A.

FIG. 7 is a vertical sectional view of a camera having the above mentioned magnetic head 101. A reference numeral 111 represents a camera body provided with a well-known aperture opening 111a, a pair of upper and lower outer rails 111b, 111b, and a pair of upper and lower inner rails 111c, 111c. A reference numeral 112 represents a platen abutted to the outer rail 111b. The frame F travels through or stopped for exposure at a space (tunnel) defined by the outer rail 111b, the inner rail 111c and the platen 112.

The magnetic head 101 is secured to the platen 112 through a mounting plate 104 attached thereto and a vis 105. The first and the second track forming arrangements 102 and 103 are located at a position sliding with the film F from a notch 112a of the platen 112. In addition, the track forming arrangements 102 and 103 are laid out at a position outside the frame (depicted by C in the figure) by a photographing lens L. A reference numeral 113 represents a pad of an elastic material. The pad is secured to a receiving member 114a of a lever 114. The lever 114 comprises elongated bores 114b and 114c. Pins 115 and 116 are inserted into the elongated bores 114b and 114c, respectively. The pins 115 and 116 are fixed to the camera body 111. In addition, the lever 114 is forced rightward in the figure by a spring 117. The spring force of the spring 117 and the pad 113 forces the traveling film F continuously to the first and second track forming arrangements 102 and 103 of the magnetic head 101. (In FIG. 7, illustrated is a condition where the first and the second track forming arrangements are before forced.)

In this event, an alternating current adapted to a signal to be recorded flows through the first and the second track forming arrangements 102 and 103 to conduct magnetic recording. A magnetic field H generated in the track forming arrangements 102 and 103 are given by H T×A, where T represents the number of windings of a coil of the track forming arrangement while A represents a current value flowing through the coil. The magnetic field H to be required depends on the coercively of a medium subjected to the magnetic recording (the magnetic storage layer of the film F in this specification). A recording energy (i.e., the magnetic field generated at the track forming arrangement; the number of windings of the coil is involved in the direct current resistance, so that to increase H T×A corresponds to a power increase with respect to the device) applied by the device (the camera in this specification) to each track forming arrangement is normally constant. In view of reducing the energy for the device, the smaller recording energy is preferable as long as the coercive force of the medium can be withdrawn.

However, the above mentioned prior art has a disadvantage that the magnetic recording may be incomplete in the photographing information track (corresponding to T1 in FIG. 6) at the transversal end of the film. This is because the film end is curled in the direction away from the magnetic head 101 as depicted by FC in FIG. 7. Contact between the track forming arrangements 102, 103 and the film F is maintained by the spring 117 and the pad 113. However, the curling force is slightly larger than the spring force and the pad 113 is insufficient for forcing the film. As a result, a small gap (depicted by S in FIG. 7) is generated at the position of the track forming arrangement 102 close to the film end. This spacing loss is mainly responsible for the incomplete magnetic recording.

In addition, as shown in right-hand portion of FIG. 7, the above mentioned problem may be solved by means of attaching the magnetic head 101 to the platen 112 inclined by an angle θ to the direction along the curling of the film, which is still not a complete solution to the above problem.

SUMMARY OF THE INVENTION

According to one aspect, the present invention is a camera adapted for films provided with magnetic storage portions or a magnetic recording apparatus for the camera of the type described comprising first information writing means for writing information in a first area of a magnetic storage portion of the film; and second information writing means for writing information in a second area of the magnetic storage portion, the second area being outside the first area of the first information writing means, in a transverse direction the second information writing means comprising means for elongating a distance to the second area of the magnetic storage portion of the film in which the second information writing means is capable of writing information than a distance to the first area of the magnetic storage portion of the film in which the first information writing means is capable of writing information. The present invention is thus directed to allow writing information in a film advantageously without causing increase of consumed energy, enlarging of the apparatus or degradation of writing performances.

Another aspect of the present invention will become more fully apparent from the following description.

DETAILED DESCRIPTION OF THE PREFERRED EMBODIMENTS

Preferred of the present invention are now described with reference to the accompanying drawings.

Figure 1:
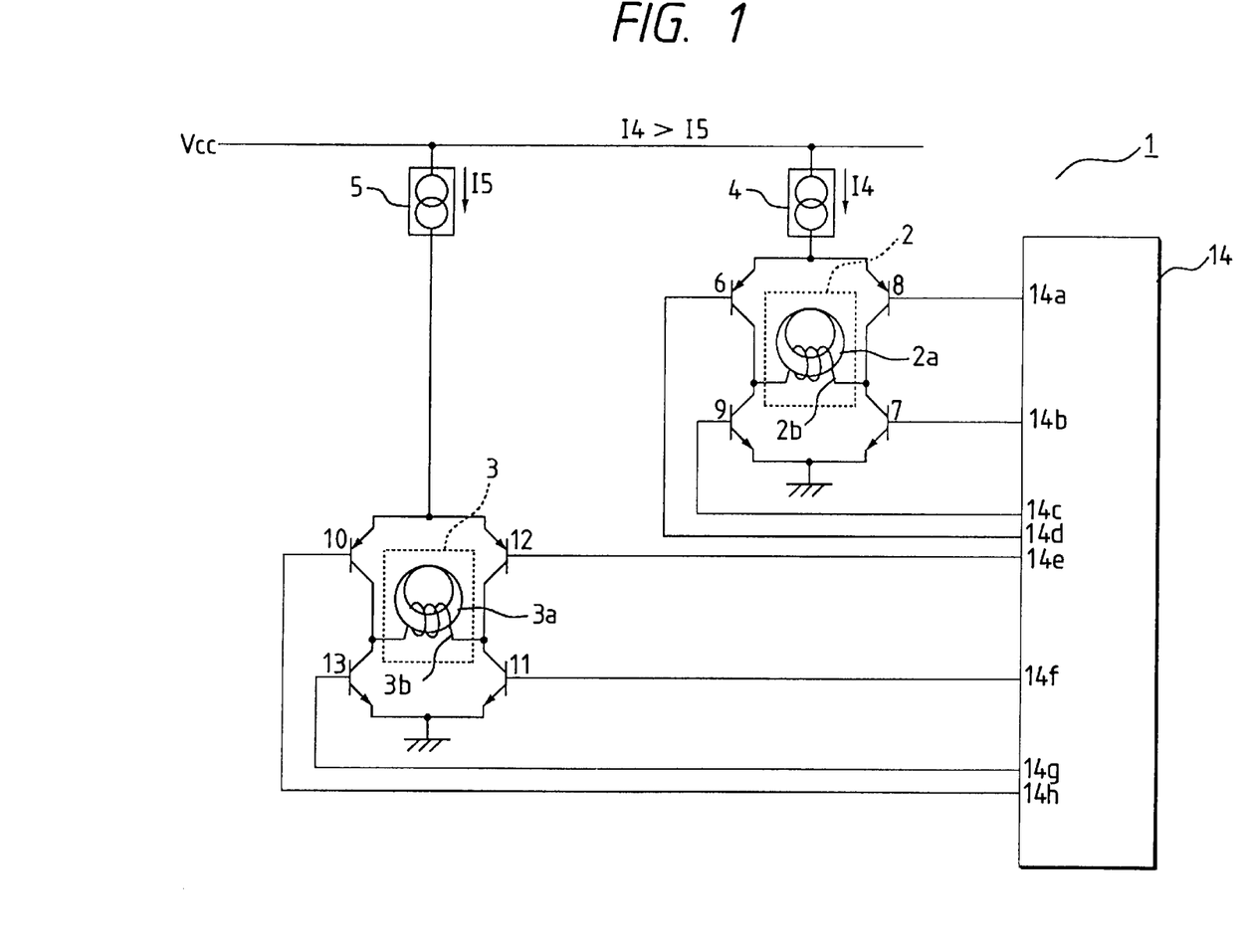
FIG. 1 is a structural diagram showing a magnetic recording circuit of a camera according to a first embodiment of the present invention.

FIG. 1 is a structural diagram of a magnetic recording circuit 1 of a camera according to a first embodiment of the present invention. In FIG. 1, reference numerals 2 and 3 represent first and second track forming arrangements. As in Related Background Art, the first track forming arrangement 2 is a track forming arrangement laid out at a position closer to the film transversal end relative to the second track forming arrangement 3. The first track forming arrangement 2 comprises a core 2a and a coil 2b. The core 2a is made of a material having high magnetic permeability on which the coil 2b is wound. Similarly, the second track forming arrangement 3 comprises a core 3a and a coil 3b. Reference numerals 4 and 5 represent constant current circuits for use in providing currents I4 and I5 to the first and the second track forming arrangements 2 and 3, respectively. The applied currents are set as I4>I5. Reference numerals 6, 8, 10 and 12 represent NPN transistors while reference numerals 7, 9, 11 and 13 represent PNP transistors. A reference numeral 14 represents a control circuit. The control circuit 14 controls terminals 14a through 14h in synchronism with a magnetic signal to be recorded. The control circuit 14 forms two photographing information tracks (T1 and T2 in FIG. 6) in a magnetic storage layer of the film by providing positive and negative currents independently for the first and the second track forming arrangements 2 and 3, respectively. Describing the first track forming arrangement 2, the coil 2b is supplied with a positive current by setting 14a=High (hereinafter, abbreviated as Hi), 14b=Hi, 14c=Low (hereinafter, abbreviated as Lo) and 14d=Lo, thereby recording a positive magnetic field in the first photographing information track (T1 in FIG. 6) of the film F through the core 2a. On the contrary, the coil 2b is supplied with a negative current by means of setting 14a=Lo, 14=Lo, 14c=Hi and 14d=Hi, thereby recording a negative magnetic field in the first photographing information track of the film F through the core 2a. Similarly, the second track forming arrangement 3 records positive and negative magnetic fields in the second photographing information track (T2 in FIG. 6) through the coil 3b and the core 3a by controlling the terminals 14e through 14h.

Let the number of windings of the coils 2b and 3b on the core be N, magnetic fields H1 and H2 generated at the first and the second track forming arrangements 2 and 3 are H1 I4·N and H2 I5·N, respectively. I4 is larger than I5, i.e., I4>I5, so that H1>H2 can be obtained. Accordingly, the magnetic recording at the first track forming arrangement 2 becomes positive or complete by increasing the magnetic field generated at the first track forming arrangement 2, where otherwise the spacing loss may be caused. A like recording current may be supplied to the second track forming arrangement 3. However, supplying larger current to the second track forming arrangement 3, where no spacing loss is caused is a waste of energy and is not favorable considering the power of the camera operated by a small cell.

Figure 2:
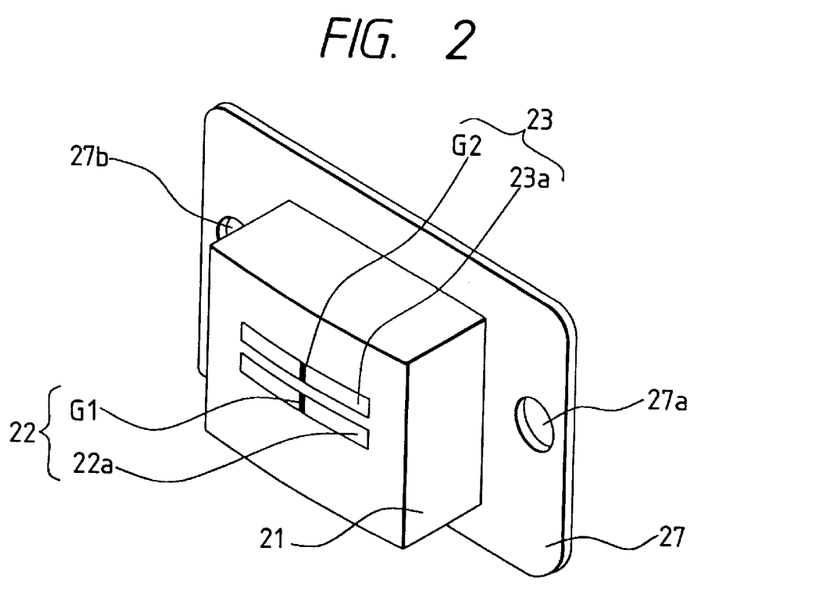
FIG. 2 is an outer configuration of a magnetic head according to a second embodiment of the present invention.
Figure 3:
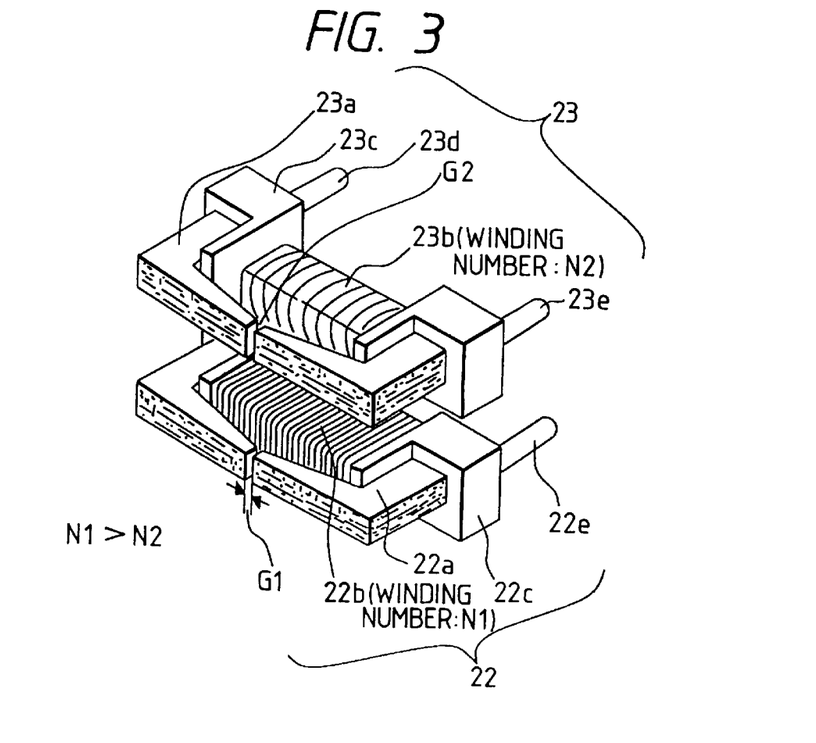
FIG. 3 is a view showing an inner structure of the magnetic head according to the second embodiment of the present invention.
Figure 4:
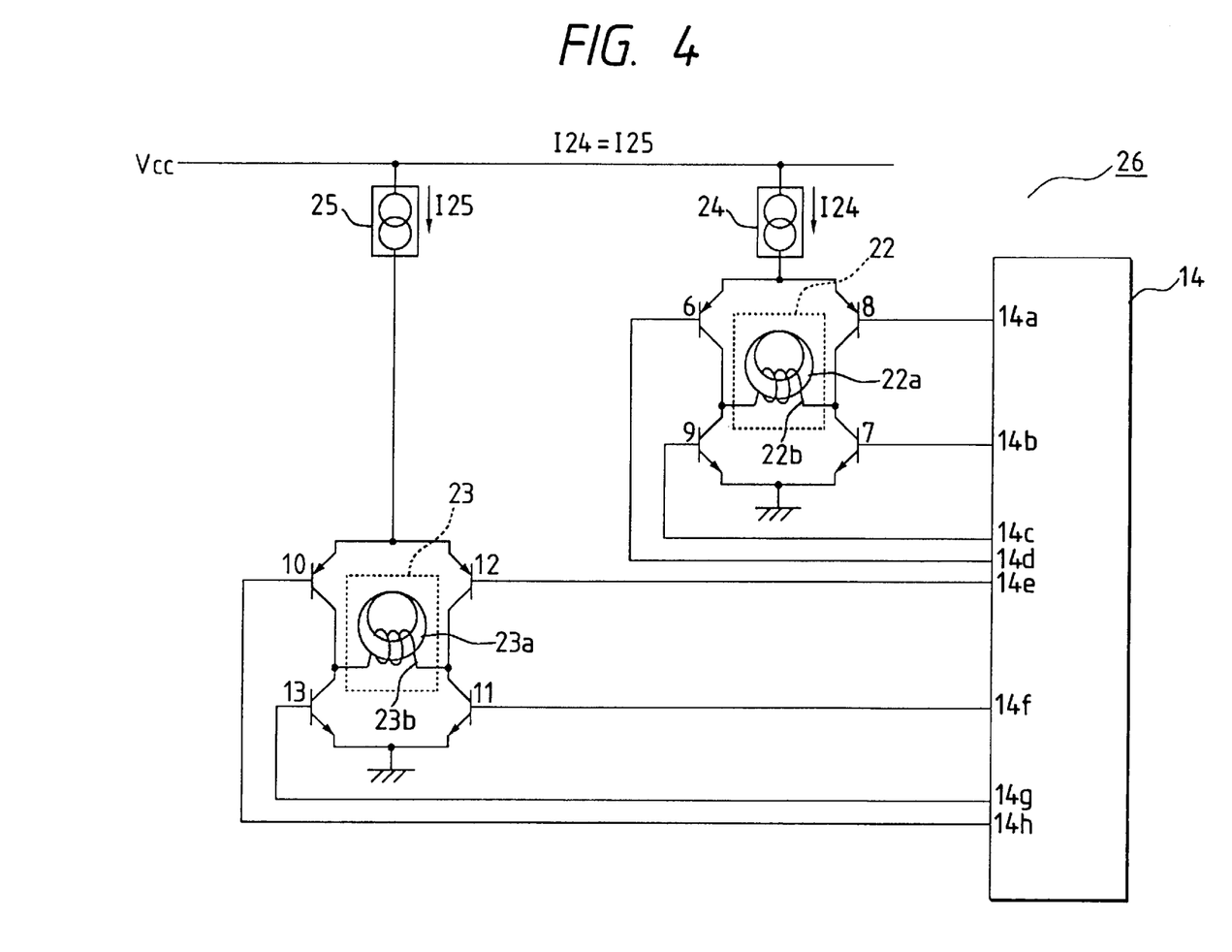
FIG. 4 is a structural diagram of a magnetic recording circuit of a camera implementing the magnetic head illustrated in FIGS. 2 and 3.

FIGS. 2 through 4 illustrate a second embodiment of the present invention. FIG. 2 is a view showing an outer configuration of a magnetic head according to this second embodiment while FIG. 3 is a view showing an internal structure thereof.

In FIGS. 2 and 3, a reference numeral 21 represents a magnetic head while a reference numeral 27 represents a mounting plate where the magnetic head 21 is secured. The mounting plate 27 is provided with mounting holes 27a and 27b for mounting the magnetic head 21 to the camera by screws. Reference numerals 22 and 23 are first and second track forming arrangements, respectively. As in the first embodiment, the first track forming arrangement 22 is laid out at the position closer to the film transversal end relative to the second track forming arrangement 23. The first track forming arrangement 22 comprises a core 22a, a coil 22b, a bobbin 22c and bobbin terminals 22d (not shown) and 22e. The bobbin 22c winds the coil thereon. The bobbin terminals are electrically connected to both ends of the wound coil to provide connection to a driving circuit of the camera. G1 represents a magnetic gap for use in recording the magnetic field generated at the core in the film F. Likewise, the second track forming arrangement 23 comprises a core 23a, a coil 23b, a bobbin 23c, bobbin terminals 23d and 23e and a magnetic gap G2. In this event, let the number of windings of the coils of the first and the second track forming arrangements 22 and 23 be N1 and N2, respectively, N1>N2 holds.

FIG. 4 is a view showing a structure of a magnetic recording circuit 26 of a camera using the magnetic head 21. This figure is similar to FIG. 1, so that similar reference numerals refer to similar elements and description of such components will be omitted. A difference between FIGS. 1 and 4 is that I24 is equal to I25, i.e., I24=I25, provided that the first and the second track forming arrangements 22 and 23 are supplied with currents I24 and I25 by constant current circuits 24 and 25, respectively. However, the magnetic fields H1 and H2 generated at the first and the second track forming arrangements 22 and 23 can be given by H1×I4×N1 and H2 I5×N2. In this event, N1 is larger than N2, i.e., N1>N2, so that H1>H2 holds. Accordingly, the magnetic recording at the first track forming arrangement 22 becomes positive or complete by increasing the recording energy at the first track forming arrangement 22, where otherwise the spacing loss may be caused. The number of windings of the coil 23b of the second track forming arrangement 23 may be increased as in the first track forming arrangement 22. However, increasing the number of windings results in increase of a head cost and enlargement of the magnetic head. Accordingly, it is not favorable by that considerations to apply this to the second track forming arrangement 23 where no spacing loss is caused.

Figure 5A:
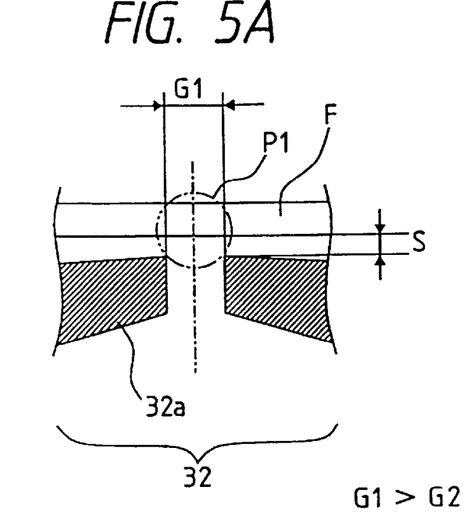
FIGS. 5A and 5B are enlarged representations of magnetic gap of a magnetic head according to a third embodiment of the present invention.
Figure 5B:
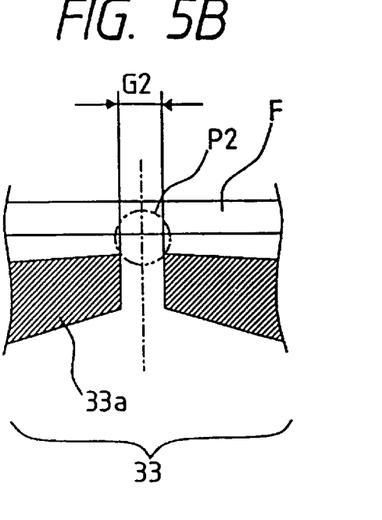

FIGS. 5A and 5B illustrate a third embodiment of the present invention. FIG. 5A is an enlarged representation of a magnetic gap portion of a first track forming arrangement 32 while FIG. 5B is an enlarged representation of the magnetic gap portion of a second track forming arrangement 33. In this embodiment, the first track forming arrangement 32 is also laid out at the position closer to the film transversal end relative to the second track forming arrangement 33. In the figure, F represents a film illustrated with a spacing (a gap between the film F and the track forming arrangement) at a distance S being formed. Reference numerals 32a and 33a represent cores of the first and the second track forming arrangements 32 and 33, respectively. G1 and G2 represent magnetic gaps generated at the first and the second track forming arrangements 32 and 33, respectively. In this event, G1 is larger than G2, i.e., G1>G2. With the wider magnetic gap, the magnetic field generated at the magnetic gap is capable of acting on a position further away from the magnetic gap. P1 and P2 are qualitative representations of isomagnetic field lines. Accordingly, it becomes possible with G1>G2 to render the first track forming arrangement 32 less sensitive to the spacing, allowing positive or complete magnetic recording at the first track forming arrangement 32, where otherwise the spacing loss may be caused. Increasing the magnetic gap is highly effective to enhancing the track forming arrangement against the spacing loss problem where the generated magnetic field may be reduced or the frequency characteristics tends to be degraded. In this respect, it is not favorable to apply this to the second track forming arrangement 33 where no spacing loss is generated.

While the above mentioned first through third embodiments have thus been described in conjunction with the case where two track forming arrangements are provided, the present invention is not limited to those specific illustrative embodiments. Instead, the present invention can be applied to a similar apparatus having three or more track forming arrangements. For example, with three track forming arrangements, I1>I2 and/or I3 or I1>I2>I3 holds in the first embodiment, where I1, I2 and I3 are current values supplied to the first through third track forming arrangements from the one closer to the film end.

In the second embodiment, N1>N2 and/or N3 or N1>N2>N3 holds, where N1, N2 and N3 are the number of windings of the coils of the first through third track forming arrangements from the one closer to the film end.

In the third embodiment, G1w>G2w and/or G3w or G1w>G2w>G3w holds, where G1w, G2w and G3w are widths of magnetic gaps G1, G2 and G3, respectively of the first through third track forming arrangements from the one closer to the film end. All of the above embodiments accord with the spirit of the present invention to overcome the problem of the spacing loss more likely generated at the track forming arrangement closer to the transversal end of the film.

As mentioned above, according to the present invention, reliable magnetic recording can be made at all track forming arrangements by: (1) flowing much current through; (2) increasing the number of windings of the coil of; (3) increasing the width of the magnetic gap generated at the track forming arrangement of a plurality of track forming arrangement that is farthest to the exposed frame than others.

While the above mentioned embodiments have thus been described in conjunction with the case where the information is written in the magnetic storage layer of the film, the present invention can equally be applied to reading the information out of the magnetic storage layer of the film, thereby improving reading ability against generation of the spacing loss between the magnetic storage layer of the film.

In addition, it is apparent that the present invention can equally be applied to an image recording medium other than films or to recording or reading other than the magnetic recording or reading.

Further, the present invention can also be applied to an apparatus for recording or reading information similarly other than a camera.

Further, the present invention may be achieved as a combination of two or more embodiments, if necessary, or the technical components thereof.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted for use with a film provided with a magnetic storage portion near an edge of the film, said camera comprising:

a guide portion that guides the film so that the film is generally flat with a curled portion at the edge of the film when the film is guided by the guide portion;

a first information recorder that records information on a first area of the magnetic storage portion of the film, said first information recorder having a first current supplying part for use in writing information in the magnetic storage portion of the film, said first current supplying part being supplied with a first current; and a second information recorder that records information on a second area of the magnetic storage portion nearer to the edge of the film than the first area of the magnetic storage portion, said second information recorder having a second current supplying part for use in writing information in the magnetic storage portion of the film, said second current supplying part being supplied with a second current larger than the first current supplied to the first current supplying part by an amount sufficient to correct a reduction in recording signal level received at the second area of the magnetic storage portion due to an increase in spacing between the film and the respective first and second information recorders caused by the curled portion.

2. A camera according to claim 1, wherein said first information recorder and said second information recorder respectively comprise a first magnetic head and a second magnetic head for use in writing information.

3. A camera according to claim 2, wherein said first current supplying part and said second current supplying part respectively supply current to said first magnetic head and said second magnetic head.

4. A camera adapted for use with a film provided with a magnetic storage portion near an edge of the film, said camera comprising:

a guide portion that guides the film so that the film is generally flat with a curled portion at the edge of the film when the film is guided by the guide portion;

a first magnetic head that records information on a first area of the magnetic storage portion of the film; and a second magnetic head that records information on a second area of the magnetic storage portion nearer to the edge of the film than the first area of the magnetic portion, wherein a magnetic gap of said second magnetic head is set larger than a magnetic gap of said first magnetic head by an amount sufficient to correct a reduction in recording signal level received at the second area of the magnetic storage portion due to an increase in spacing between the film and the respective first and second magnetic heads caused by the curled portion of the edge of the film.

5. A camera according to claim 4, further comprising current supplying circuits that supply current to said first magnetic head and said second magnetic head so as to perform recording operations.

6. A magnetic recording apparatus for a camera adapted for use with a film provided with a magnetic storage portion near an edge of the film, said recording apparatus comprising:

a guide portion that guides the film so that the film is generally flat with a curled portion at the edge of the film when the film is guided by the guide portion;

a first information recorder that records information on a first area of the magnetic storage portion of the film, said first information recorder having a first current supplying part for use in writing information in the magnetic storage portion of the film, said first current supplying part being supplied with a first current; and a second information recorder that records information on a second area of the magnetic storage portion nearer to the edge of the film than the first area of the magnetic storage portion, said second information recorder having a second current supplying part for use in writing information in the magnetic storage portion of the film, said second current supplying part being supplied with a second current larger than the first current supplied to the first current supplying part by an amount sufficient to correct a reduction in recording signal level received at the second area of the magnetic storage portion due to an increase in spacing between the film and the respective first and second information recorders caused by the curled portion.

7. An apparatus according to claim 6, wherein said first information recorder and said second information recorder respectively comprise a first magnetic head and a second magnetic head for use in writing information.

8. An apparatus according to claim 7, wherein said first current supplying part and said second current supplying part respectively supply current to said first magnetic head and said second magnetic head.

9. A magnetic recording apparatus for a camera adapted for use with a film provided with a magnetic storage portion near an edge of the film, said apparatus comprising:

a guide portion that guides the film so that the film is generally flat with a curled portion at the edge of the film when the film is guided by the guide portion;

a first magnetic head that records information on a first area of the magnetic storage portion of the film; and a second magnetic head that records information on a second area of the magnetic storage portion nearer to the edge of the film than the first area of the magnetic storage portion, wherein a magnetic gap of said second magnetic head is set larger than a magnetic gap of said first magnetic head by an amount sufficient to correct a reduction in recording signal level received at the second area of the magnetic storage portion due to an increase in spacing between the film and the respective first and second magnetic heads caused by the curled portion of the edge of the film.

10. An apparatus according to claim 9, further comprising current supplying circuits that supply current to said first magnetic head and said second magnetic head so as to perform recording operations.

* * * * *

UNITED STATES PATENT AND TRADEMARK OFFICE
CERTIFICATE OF CORRECTION

PATENT NO. : 6,195,512 B1
DATED : February 27, 2001
INVENTOR(S) : Shinichi Tsujimoto It is certified that error appears in the above-identified patent and that said Letters Patent is hereby corrected as shown below:

Title page,
FOREIGN PATENT DOCUMENTS,
"2249103" should read -- 2-249103 --.

Item [57], ABSTRACT,
Line 13, "than" should read -- longer than --.

Column 1,
Line 5, "8/193,555" should read -- 08/193,555 --.

Column 2,
Line 37, "H TxA," should read -- H $\propto$ TxA, --.
Line 41, "coercively" should read -- coercivity --.
Line 46, "H TxA," should read -- H $\propto$ TxA, --.

Column 3,
Line 16, "means," should read -- means --.
Line 17, "direction" should read -- direction, --.
Line 21, "than" should read -- longer than --.
Line 55, "Preferred" should read --Preferred embodiments --.

Column 4,
Line 33, "H1 I4·N and H2 I5·N," should read -- H1 $\propto$ I4·N and H2 $\propto$ I5·N, --.
Line 42, "caused" should read -- caused, --.

UNITED STATES PATENT AND TRADEMARK OFFICE
CERTIFICATE OF CORRECTION

PATENT NO. : 6,195,512 B1
DATED : February 27, 2001
INVENTOR(S) : Shinichi Tsujimoto It is certified that error appears in the above-identified patent and that said Letters Patent is hereby corrected as shown below:

<u>Column 5,</u>
Line 16, "H1 x I4 x N1" should read -- $H1 \propto I4 \times N1$ --.
Line 17, "H2 I5 x N2." should read -- $H2 \propto I5 \times N2.$ --.
Line 27, "that" should read -- these --.
Line 58, "tends" should read -- tend --.

<u>Column 6,</u>
Line 24, "arrangement" should read -- arrangements --.

Signed and Sealed this

Twelfth Day of March, 2002

Attest:

Attesting Officer

JAMES E. ROGAN
Director of the United States Patent and Trademark Office